United States Patent [19]
Liedtke

[11] Patent Number: 5,390,763
[45] Date of Patent: Feb. 21, 1995

[54] WINDING MECHANISM FOR RUBBER BAND MOTOR

[75] Inventor: Ronald Liedtke, Fox Lake, Ill.

[73] Assignee: Marchon, Inc., Vernon Hills, Ill.

[21] Appl. No.: 16,845

[22] Filed: Feb. 12, 1993

[51] Int. Cl.⁶ .......................... F03G 1/04; F03G 1/08; A63H 27/00

[52] U.S. Cl. ................................ 185/39; 185/DIG. 1; 192/12 B; 446/60

[58] Field of Search ............................ 185/39, DIG. 1; 192/12 B; 446/60, 459

[56] References Cited

U.S. PATENT DOCUMENTS 3,721,317 3/1973 Gay et al. ...................... 185/DIG. 1

4,881,621 11/1989 Ishida .............................. 185/DIG. 1

Primary Examiner—Allan D. Herrmann
Attorney, Agent, or Firm—Laff, Whitesel, Conte & Saret

[57] ABSTRACT

A device for winding a rubber band motor has a very light weight so that it may be carried by a model airplane, almost without any weight penalty. A pulley with a recoil spring has a string wound thereon so that the release of a pulled string rewinds it onto the pulley. A clutch mechanism engages the pulley and rubber band when the string is pulled and disengages when the string rewinds. This way, the string may be pulled repeatedly in order to store more energy in the rubber band.

11 Claims, 4 Drawing Sheets

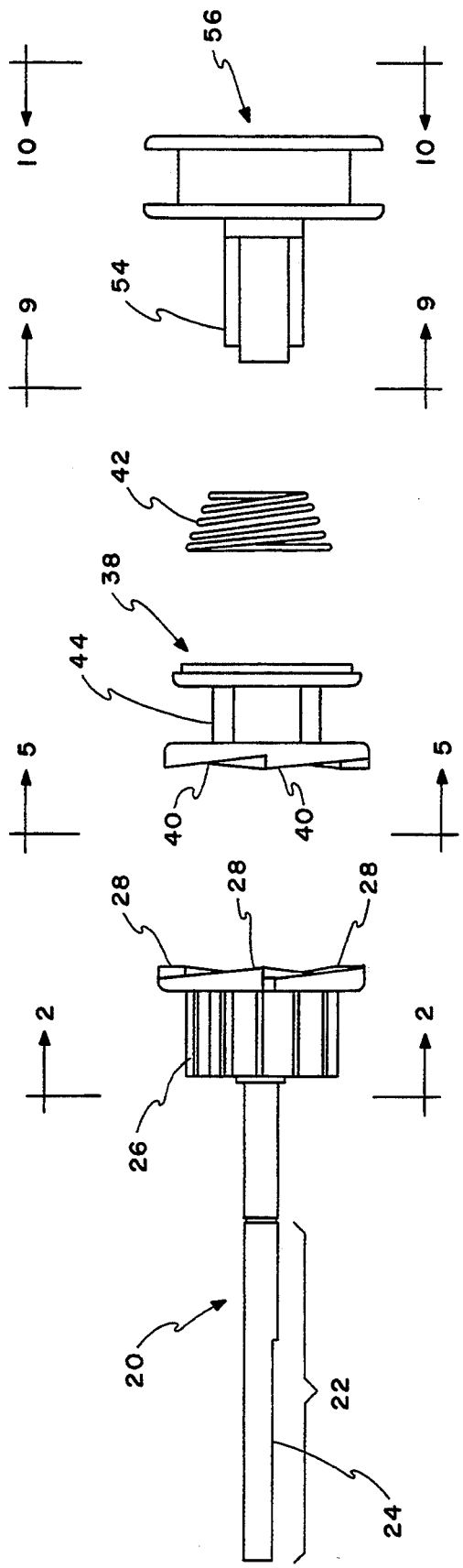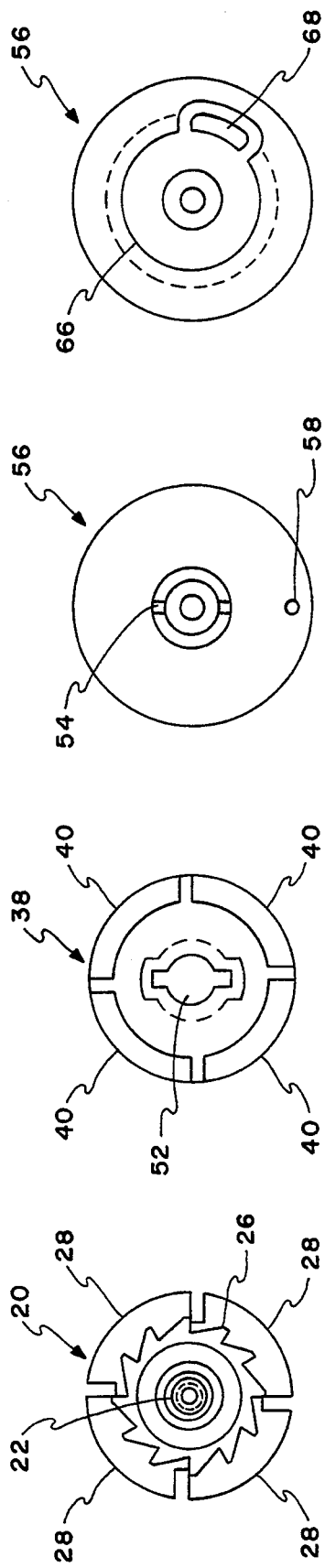

WINDING MECHANISM FOR RUBBER BAND MOTOR

This invention relates to rubber band motors, and more particularly to mechanisms for winding such motors.

BACKGROUND OF THE INVENTION

Rubber band motors are used to power many things, toys—especially model airplanes—being among the more common things. However, rubber band motors have more uses than model airplanes. For example, among the toys, they may power almost any vehicle, such as model autos, boats, and the like.

A common problem with rubber band motors is that they must first be wound to store energy. In the simplest motors, this means turning a propeller, or the like, with a finger which is a time consuming and boring chore. Another winding device is a separate unit, such as a small hand drill, which may be hooked to the propeller. Then, a hand crank or wheel is turned to rotate the propeller and store energy in the rubber band. However, this use of a separate unit requires one to carry and hook together more parts, and often requires two people, one to hold the model airplane and the other to hold the unit and turn the crank.

Hence, a desirable rubber band motor requires something which is fast operating, which does not require extra parts, and which may be used by a single person. This, in turn, means that it must be extremely lightweight since a model airplane powered by a rubber band motor does not have the energy to lift much weight.

SUMMARY OF THE INVENTION

Accordingly, an object of the invention is to provide new and novel rubber band motors. Here, an object is to provide means for winding the rubber band motor quickly and easily. In this connection, an object is to provide a very lightweight rubber band wind-up mechanism which may be carried by a model airplane almost without any weight penalty.

In keeping with an aspect of the invention, these and other objects are accomplished by providing a pulley having a string wound thereon with a retraction spring so that the release of a pulled string rewinds it onto the pulley. A clutch mechanism engages the pulley and rubber band when the string is pulled and disengages when the string rewinds. This way, the string may be pulled repeatedly in order to store more energy in the rubber band.

BRIEF DESCRIPTION OF DRAWINGS

The invention will be best understood from a study of the following specification along with the attached drawing, in which:

FIG. 1 is a side view of a ratchet and drive shaft;

FIG. 2 is a cross section taken along line 2—2 of FIG. 1;

FIG. 4 is a side elevation of a ratchet driver;

FIG. 5 is an end view of the ratchet driver taken along line 5—5 of FIG. 4;

FIG. 8 is a side elevation of a pulley on which a string is wound;

FIG. 9 is a second side elevation of the pulley, taken along line 9—9 of FIG. 8;

FIG. 10 is a side elevation of the pulley wheel taken along line 10—10 of FIG. 8;

FIG. 11 is a coiled spring for pressing the ratchet drive and the ratchet shaft and drive into contact with each other;

DETAILED DESCRIPTION OF INVENTION

Figure 3:
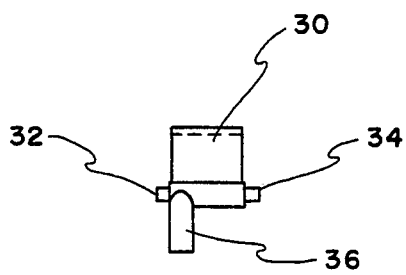
FIG. 3 is a side view of a latch pawl for holding the ratchet.

When FIGS. 1, 4, 11, 8 are viewed as a whole, they constitute an exploded view of the winding mechanism.

FIGS. 1 and 2 show a ratchet and drive shaft 20. One end 22 is an output or drive shaft which receives a propeller or other driven device. A flat face 24 on the shaft 22 makes and keys a positive locking contact with the propeller to insure that it rotates with the shaft. The opposite end of the ratchet and drive shaft 20 has two sets of ratchet teeth 26, 28. Axial teeth 26 are aligned with shaft 22 and are engaged by a pawl to prevent the shaft from rotation in a rubber band unwinding direction. Radial teeth 28 are perpendicular to the shaft and are used to transmit power from a ratchet driver to wind up the rubber band responsive to a pulled string.

Figure 6A:
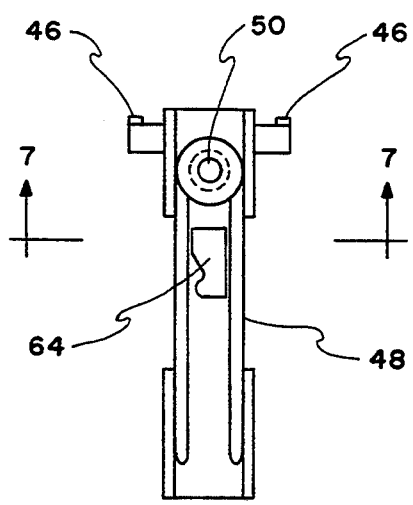
FIG. 6A is a bottom plan view of a slide latch for moving the ratchet driver into and out of engagement with the ratchet and drive shaft (FIG. 1) and FIG. 6B are two fragmentary views taken from FIG. 6A and showing means for selectively releasing (FIG. 6B(a)) and holding (FIG. 6B(b)) the ratchet and drive shaft against the bias of a wound rubber band.
Figure 6B:
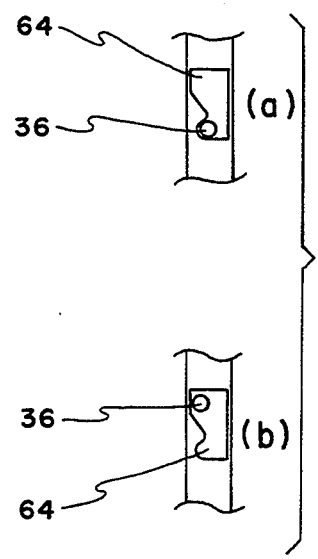
Figure 12:
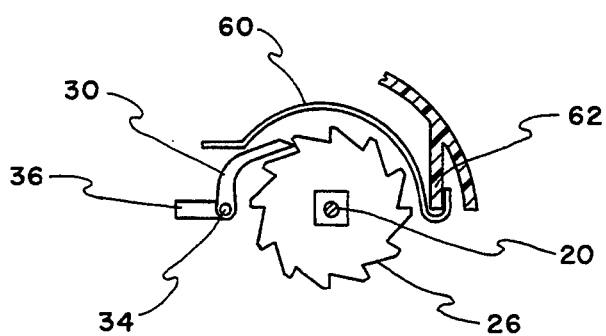
FIG. 12 is a partial cross section taken along line 12—12 of FIG. 14.

FIG. 3 shows a ratchet pawl 30 which is pivotally mounted on trunnions 32, 34. The pawl 30 ratchets over the teeth 26 unless it is withdrawn by a force acting on a control lever arm 36. This force is applied or removed in response to a movement of a sliding latch bar (FIG. 6).

A clutch means is provided by ratchet driver 38 (FIGS. 4, 5) which has radial teeth 40 which mesh with radial teeth 28 on the ratchet and drive shaft 20. A coiled spring 42 (FIG. 11) normally presses the radial teeth 40 on the ratchet driver into engagement with the radial teeth 28 on shaft 20. Therefore, when the ratchet driver 38 is rotated, the shaft 20 is also rotated if the ratcheting teeth turn in an engaging direction (i.e. during the rubber band wind-up).

Figure 7:
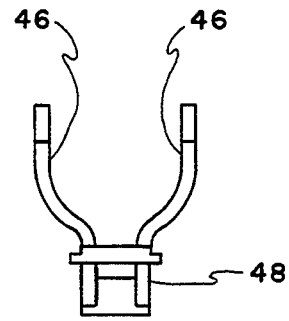
FIG. 7 is an end elevation view of the latch, taken along line 7—7 of FIG. 6A.

The ratchet driver 38 has a space 44 which may be occupied by latch arms 46 (FIGS. 6, 7) mounted on sliding latch bar 48 which may be manually pushed back and forth to cause the ratchet driver to engage or disengage the ratchet and drive shaft. A post 50 provides an actuator handle that may be pushed to move the sliding latch bar 48.

At its hub, the ratchet drive 38 has a keyed slot 52 (FIG. 5) which receives a similarly keyed post 54 at the hub of pulley wheel 56 (FIGS. 8, 9 and 10). A coiled spring 42 (FIG. 11) fits over the shaft 54 and between the ratchet driver 38 and pulley wheel 56 to normally urge the ratchet driver into contact with the ratchet and drive shaft 20 (i.e. to urge radial teeth 28, 40 into contact).

The latching mechanism is best shown in FIGS. 6, 7, 12, and 13. The pawl 30 is biased into a ratchet capture position by a leaf spring 60 which is anchored on a step 62 (FIG. 12) molded in the housing. The pawl 30 prevents an unwinding of the rubber band. The control lever arm 36 of the pawl fits into a slot 64 formed in the sliding latch bar 48. FIG. 6B shows how the lever arm 36 may be captured in either of two positions within slot 64 depending upon a sliding of bar 48. When arm 36 is captured in one end of slot 64 (FIG. 6B(b)), the pawl 30 engages teeth 26. When captured in the other end of the slot (FIG. 6B(a)), the pawl is disengaged from the teeth. Therefore, as the latch bar 48 slides back and forth, the pawl 30 is automatically lifted or lowered to release or hold the shaft. Latch bar 48 lifts pawl 30 out of engagement with axial teeth 26 during the unwinding of the rubber band.

Figure 13:
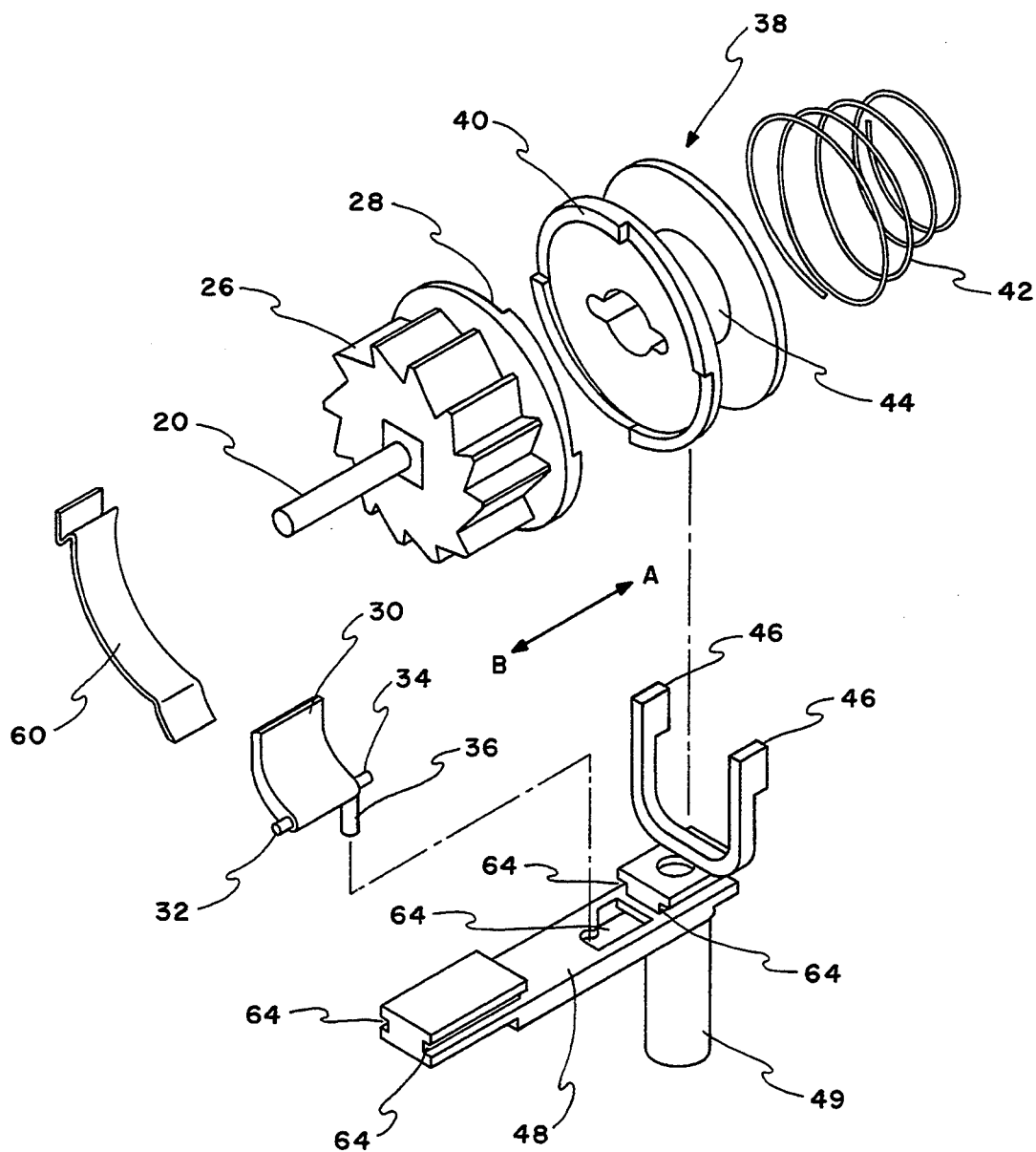
FIG. 13 is an exploded view, in perspective, of a latching and unlatching mechanism.
Figure 14:
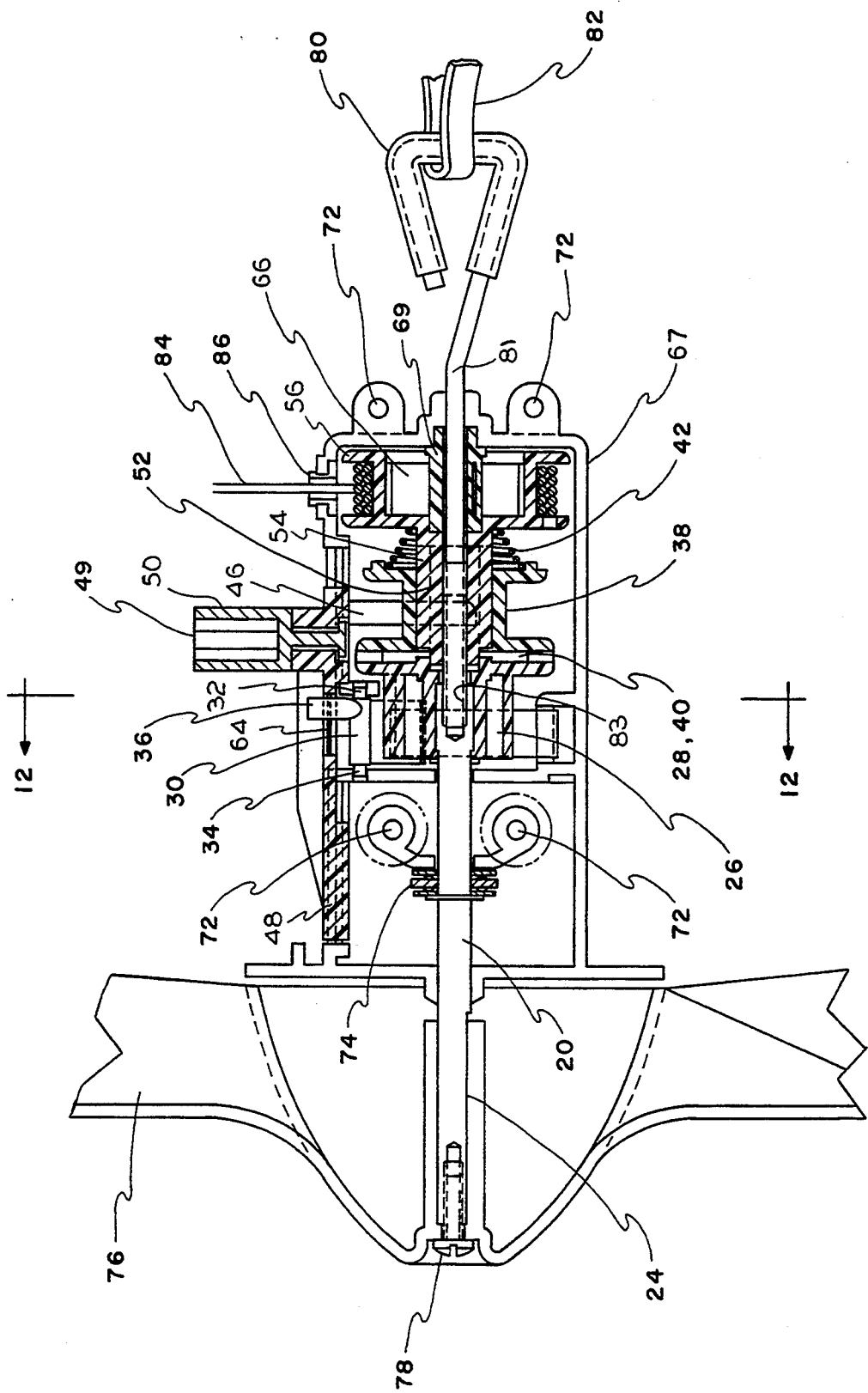
FIG. 14 is a drawing showing an assembly of the parts shown in FIGS. 1–11.

FIG. 13 shows details of the sliding latch bar 48 which is a molded, integral, plastic piecepart. Grooves 64 slide on guide rails molded into housing 67 (FIG. 14). The latch arms 46 fit within the space 44 between the flanges of the ratchet driver 38. Therefore, when the latch bar 48 is slid in Direction A (FIG. 13), the radial teeth 40 on ratchet driver are moved out of engagement with the radial teeth 28 on ratchet and drive shaft 20, while the pawl 30 is moved (FIG. 6B(b)) to disengage the teeth 26, thereby allowing the ratchet shaft 20 to turn freely under the urging of energy stored in the wound up rubber band. When the sliding latch bar 48 is slid in Direction B, the coiled spring 42 presses radial teeth 28, to engage radial teeth 40 while the pawl 30 is lowered (FIG. 6B(a)) to engage teeth 26. In this position, the ratchet shaft 20 cannot turn in a direction to release the energy stored in the rubber band; however, the ratchet 20 shaft can turn in a direction to store the energy imparted by pulling string 84.

FIGS. 9 and 10 show the two opposing flanges on the pulley 56. A string is passed through hole 58 in a side flange (FIG. 9) in order to attach it to the pulley. A circular groove (FIG. 10) formed in pulley 56 contains a recoil clock spring 66 anchored at one end to a molded pulley wheel post 68 and on the other end to post 69 (FIG. 14) on the motor housing. Thus, when a string wound on pulley 56 is pulled, the recoil clock spring is wound to store energy while the engaged radial ratchet teeth 28, 40 turn shaft 20. When the string is released, the energy stored in the recoil clock spring is released to rewind the string onto the pulley. The two radial ratchet teeth 28, 40 pass over each other. The pawl 30 holds drive shaft 20 during recoil.

The assembly of the parts of FIGS. 1-11 is found in FIG. 14. A suitable housing 67 has four screw holes 72 for attaching the housings together. The housing includes a mount for a bearing race 74 in which the ratchet and drive shaft 20 is supported. A propeller 76 is fitted over the flat keying face 24 on the end of shaft 20 so that the propeller and shaft turn in unison. A screw 78 holds the propeller 76 in place on the shaft 20.

A hook 80 is on a shaft 81 that has a threaded end 83 which fits into and anchors the hook to the end of shaft 20 which is opposite the end carrying the propeller. Any suitable number of rubber bands 82 are fitted onto the hook 80. Thus, if the shaft 20 is turned, the rubber band 82 is wound to store energy. If the shaft 20 is released, any energy stored in the rubber band 82 is imparted through shaft 20 to turn the propeller 76. The sliding latch bar 48 may be moved back and forth to lock or unlock the shaft.

The string 84 is wound onto pulley 56 and passed through an eye 86 in the housing 66. When the string 84 is pulled, pulley 56 rotates while winding the clock spring 66 and turning ratchet driver 38. The ratchet driver 38 transmits the turning force through radial teeth 28, to radial teeth 40 and to the shaft 20 and, therefore, to the rubber band. If the string 84 is released, it rewinds on pulley 56, under the urging of energy stored in clock spring 66, while pawl 30 holds the shaft 20 so that it will not release the energy stored in rubber band 82. The radial teeth 28, 40 ratchet over each other during the rewinding of the string.

After the string 84 is rewound on the pulley 56, the user may again pull the string 84 to store more energy in the rubber band 82. The process may be repeated as many times as desired, up to the limit of the rubber band to store energy without breaking.

If the sliding latch bar 48 disengages the driver 38 and shaft 20, it rotates under the urging of the energy stored in the rubber band 82, thereby delivering power to turn the propeller.

Those who are skilled in the art will readily perceive how to modify the invention. Therefore, the appended claims are to be construed to cover all equivalent structures which fall within the true scope and spirit of the invention.

I claim:

1. A winding mechanism for a rubber band motor, said mechanism comprising: a shaft having means on one end for attachment to a rubber band and means on the other end for attachment to a driven device, a pulley having a self retracting string wound thereon, and a ratchet means interposed between said shaft and said pulley for translating a rotation of said pulley into a rotation of said shaft, whereby said rubber band may be wound to store energy in response to pulling said string, said pulley being separate from said ratchet means, means for holding said shaft after said string is pulled and while said string is being self retractingly rewound on said pulley, and means for selectively releasing said holding means to deliver the energy stored in said rubber band.

2. The mechanism of claim 1 wherein said holding means includes a ratchet and pawl for restraining said rotation of said shaft during said rewinding whereby energy may be incrementally stored in said rubber band by repeatedly pulling said string.

3. The mechanism of claim 1 and clock spring means associated with said pulley for rewinding the string on said pulley responsive to a release of a pulled string.

4. The winding mechanism of claim 1 and latch means for selectively disengaging said winding mechanism to restrain it from dissipating said energy stored in said rubber bands during unwind.

5. The winding mechanism of claim 1 wherein said shaft has a first plurality of radial teeth on a surface perpendicular to said shaft, a ratchet driver having a second plurality of radial teeth on a surface parallel to the radial teeth on said shaft, means for sliding said ratchet driver in one direction to engage said first and second radial teeth for transferring a driving force from said pulley to said shaft or for sliding said ratchet driver in an opposite direction to disengage said first and second radial teeth, whereby said shaft is free to rotate without engaging said ratchet driver.

6. The mechanism of claim 5 and spring means for normally urging said first and second radial teeth into meshing engagement with each other.

7. A rubber band motor winding device comprising a shaft having a model airplane propeller attached to one end and a manually operated clutch at the other end, means for attaching a rubber band motor directly to said shaft, a spring biased pulley and a separate ratchet, said pulley having a pull string wound thereon and releasably coupled to turn said shaft, a pull on said string storing recoil energy in said spring bias and simultaneously winding said rubber band, a release of said string rewinding it on said pulley responsive to the stored spring bias energy, and means for operating said clutch during said pulling of said string in order to hold the energy in said wound rubber band and for disengaging said clutch after said pulling is completed whereby energy stored in said rubber band may rotate said propeller free of said spring bias at said pulley.

8. The rubber band winding device of claim 7 and ratchet drive means for interconnecting said shaft and said spring biased pulley, said ratchet drive means being engaged during a winding up of said rubber band motor and ratcheting to disengage said rubber band motor during said recoil of said string.

9. The rubber band winding device of claim 8 wherein said manually operated clutch comprises latch means for slidably moving said ratchet means for activating or deactivating said coupling between said pulley and said shaft, and a second ratchet means for enabling a one way rotation of said shaft to wind up said rubber band, and means responsive to said deactivating slidable movement of said latch means for removing said one-way enablement to release said shaft for unencumbered rotation.

10. A toy airplane motor comprising a shaft having an end with a keying surface on one end thereof, a propeller fitting said keying surface in order to cause said shaft and propeller to turn as a unit, means on an opposite end of said shaft for holding a rubber band, a pair of shaft ratchets on said shaft, each of said ratchets enabling a rotation of said shaft in a wind up direction, a spring biased pulley with string wound thereon for turning said shaft when said string is pulled and for rewinding said string when it is released, a ratchet driver interposed between said pulley and one of said shaft ratchets for transmitting a turning of said pulley to said shaft when said string is pulled but not when it rewinds, pawl means associated with the other of said shaft ratchets for holding said shaft while said string rewinds, and means for disengaging both of said ratchets to enable energy stored in said rubber band to freely turn said shaft.

11. A toy airplane motor comprising a shaft having an end with a keying surface thereon, a propeller fitting said keying surface in order to cause said shaft and propeller to turn as a unit, means on said shaft for holding a rubber band, a pair of shaft ratchets on said shaft, each of said ratchets enabling a rotation of said shaft in a wind up direction, a spring biased pulley with string wound thereon for turning said shaft when said string is pulled and for rewinding said string when it is released, a ratchet driver interposed between said pulley and one of said shaft ratchets for transmitting a turning on said pulley to said shaft when said string is pulled but not when it rewinds, pawl means associated with the other of said shaft ratchets for holding said shaft while said string rewinds, and means for disengaging both of said ratchets to enable energy stored in said rubber band to freely turn said shaft, said pulley and ratchet driver being mounted to rotate in unison and with a sliding relationship between them, spring means between said pulley and ratchet driver for normally urging said ratchet driver into engagement with said one shaft ratchet, and said disengaging means sliding said ratchet driver away from said one shaft ratchet.

* * * * *